Patented Nov. 1, 1938

2,135,430

UNITED STATES PATENT OFFICE 2,135,430

TREATMENT OF STILL RESIDUE

Frank W. Corkery, Crafton, Pa.

No Drawing. Application August 14, 1937,
Serial No. 159,071

1 Claim. (Cl. 196—87)

This invention relates to a method of oxidizing the coal-derived products known as "still residue" to produce a residual gum generally similar to that disclosed in my co-pending application Serial No. 53,213, and substantially identical with the product disclosed in my co-pending application Serial No. 120,192, filed January 12, 1937.

The "still residue" with which I work has its proximate derivation in light oil derived in the by-product distillation of coal. This light oil comes over in by-product coking, and is recovered from the gases with which it comes over by absorbing it in a scrubbing oil, which scrubbing oil is usually a heavy cut of petroleum. The still residue itself results from fractionating and purifying treatment of this light oil, following its separation from the scrubbing oil. This still residue contains polymers of resin-forming bodies in various stages of polymerization, some heavy polymers, traces of naphthalene, and various percentages of sulphates and sulphonates. It is a dark, viscous, oily substance deficient in drying qualities, and as it occurs possesses but little utility in the arts. As it is commercially available, the still residue may be obtained from any one or more of the following operations conducted upon the light oil.

One such source of still residue is the stills in which the light oil is purified and fractionated to give crude benzol, crude toluol, No. 1 crude solvent naphtha (crude xylol), and No. 2 crude solvent naphtha. The residuum from this fractionation consists largely of heat polymers, and is known in the trade as "crude still" residue. Either the entire body of light oil, or fractions from the crude still, after washing with sulphuric acid and neutralizing, are distilled in what are known in the trade as "pure stills". The residues from the distillation of these fractions comprise primarily acid polymers and heat polymers, and comprise also sulphate and sulphonates from acid purification and neutralization. This "pure still" residue normally is mixed in a tank with the "crude still" residue, so that, as it is commercially available, still residue contains at least the residual products from these two types of still dealing with coke-oven light oil and its fractions.

Usually there is also mixed in with these two still residues in the residue tank a third residue, which comprises bottoms from the distillation of the heavier cuts of No. 1 and No. 2 crude solvent naphtha. Usually the still residue is subjected to a distillation for the removal of solvents and naphthalene. There is variation in the above-noted practice in different coking plants. A light oil is in some plants additionally recovered by distillation of the tar in which it is entrapped, not all of the light oil coming over during the initial distillation. This fraction of light oil recovered from the tar is contaminated with phenols, pyridine bases and compounds, and other typical tar ingredients, which, however, are removed by a preliminary purification prior to the several typical fractionating and purifying treatments given above to which the light oil is subjected. The residues with which I deal may be considered for all practical purposes as free from tar ingredients, even though derived or partially derived from the distillation of tar.

In preparation for oxidation, I, desirably, remove sulphonates, as for example in the manner described in my co-pending application Serial No. 120,192 which has been above noted. Whereas for many uses it is advantageous to retain and oxidize substantially the entire content of the still residue (sulphates, sulphonates, and the like, being considered as wholly foreign bodies), for other purposes advantages are derived from removing a portion of the oily lower polymers of the still residue prior to oxidation. In my co-pending application Serial No. 120,192, these oily lower polymers, which consist of the aromatic oils boiling up about from 275° C., to 290° C., and an oily substance formed of the dimers of the resin-forming bodies (such as coumarone and indene) in the still residue, and which boil from about 300° C., to 360° C., are removed by distillation prior to oxidation. I have discovered that, by subjecting the still residue to an oxidation treatment under temperature conditions higher than those disclosed in my co-pending application Serial No. 53,213, I am able to blow off a portion of the oily lower end of the still residue, to obtain an effect analogous to that obtained by the topping distillation disclosed in my co-pending application Serial No. 120,192.

In conducting an oxidation treatment, in which a substantial proportion of the oily lower boiling end of the still residue is removed, the still residue, which desirably has been freed of sulphonates, but which may consist of the entire body of the still residue if so desired, is introduced into a vessel provided with coils for circulating steam, or other heating medium, and provided with perforated coils connected with a blower for introducing air under pressure. In order to obtain the purpose specifically contemplated herein, the still residue is initially heated to a temperature in excess of 225° F., and desirably approaching 275°

F. Temperature of such order not only increases the fluidity of the material sufficiently to facilitate the dispersion of air through it, but also raises the vapor pressure of the material to a point at which the lower boiling end of the still residue tends to be carried off by passage of air through the body of still residue. In the early stages of the process, there is thus an effect apportioned between the tendency for the lower boiling end of the still residue to be blown off and a tendency for the lower boiling end of the still residue to be oxidized, and by oxidation to become more difficult of removal.

The air blowing, by which oxidation is primarily effected is continued for from 2 to 6 days, in accordance with the desired consistency or melting point of the product for its ultimate intended use. Thus for mastic tile and linoleum a blowing treatment continued for from 3 to 4 days, gives a melting-point of around 120° F. For use as an adhesive, an oxidation treatment of less than 3 days is desirable, while for use in making molded articles, and for use in tile and linoleum of the grades which are adapted for heavy duty, it is desirable to continue the oxidation treatment for more than 4 days, to impart a melting-point of 150° F. upward.

As explained in my application Serial No. 120,192, I have discovered that for certain purposes, and chiefly for use in linoleum and mastic tile, a lesser elasticity than that obtained by oxidizing the total content of the still residue (disregarding foreign bodies, such as sulphonates, naphthalene, and solvents) is desirable. When the entire true content of the still residue is oxidized into the state of a solid up to a desired melting-point it has high penetration and elasticity. As an example, when the total true still residue is oxidized to a melting-point of 180° F., it acquires a penetration of approximately 14 at 77° F. under a 50 gram load. As forming the body of tile, or linoleum, it then lacks firmness sufficient to support loads without yielding to a material extent. It is susceptible to penetration under concentrated forces, such as the feet of articles of furniture at which a substantial weight load is concentrated. For this purpose, therefore, I have found it desirable to remove a proportion of the oily lower boiling end of the still residue to provide, upon adequate oxidation, a solid material of adequately high melting-point and of moderate penetration and elasticity, so that as incorporated in tile or linoleum it may have adequate weight-supporting firmness. As an example, the still residue, with about 70% of its oily lower boiling end removed, when oxidized to a melting-point of 180° F., acquires a penetration of only about 3.0 to 3.5 at 77° F. under a 50 gram load. In contemplation of such use, the extent to which the still residue is topped will depend upon the type of tile or linoleum which is to be made from the oxidized product; that is, in accordance with the load-carrying firmness which may be necessary for it in its contemplated use and to the climate in which the linoleum or tile is to be used.

In accordance with the present procedure, the portion of the oily lower boiling end of the still residue which is removed, is dependent upon conditions existing in the initial stages of the oxidation treatment. Thus, assuming that the still residue comprises a normal content of lower boiling ingredients, a treating temperature of about 250° F. to 260° F. during the first day or two of the treatment causes from about 20% to 50% of the lower boiling end of the still residue to be removed. If the temperature during the first day or two of treatment approaches 275° F. and upward, approximately 70% of the lower boiling end of the still residue will be blown off during this initial stage of treatment.

After the initial stage of the treatment, which determines the proportion of the lower boiling end of the still residue which is retained and oxidized, the treatment is continued for from 1 to 4 days longer, in accordance with the desired stage of oxidation, as has been above noted. Throughout this latter stage of blowing, which is proposed wholly for oxidation, the temperature of the still residue content which remains is held above 275° F., and desirably somewhat exceeds 300° F., in order to maintain the still residue adequately liquid for the dispersion of air therein. With blowing carried to any stage, the result of the blowing is an oxidation of the unsaturates of the still residue, giving it drying qualities and increased viscosity.

Comparing the stripped and oxidized still residue with the product resulting from a similar oxidation of the entire true content of the still residue, the characteristics of decreased elasticity and penetration are the typical results of the stripping. The stripped and oxidized product, like the product obtained by oxidizing a topped still residue, may be considered to occupy in respect to these qualities a position intermediate that of an oxidized complete still residue, and the hard resinous material obtainable by distilling off all the lower polymers of still residue contained in its oily lower boiling end. Its penetration and elasticity are substantially greater than like qualities of a true resin, although there are less than those possessed by a product in which the entire true content of the still residue is oxidized.

If the still residue is, as is desirable, purified of sulphates and sulphonates prior to oxidation, the oxidized product is a homogeneous material free from curds, and in its less highly oxidized state is soluble in the common aliphatic solvents, without sludge formation. The viscosity or melting-point depends upon the extent to which the content of the lower boiling end of the still residue, including dimers of coumarone, indene, and the like resin-forming bodies, have been removed during the initial stage of the oxidation treatment. Whereas the product lacks the elasticity, which is a typical characteristic of a still residue oxidized in accordance with the method disclosed in my application Serial No. 53,213, it is useful for many of the purposes for which the resin is commonly employed, and (like the product obtained by following the method of my application Serial No. 102,192) possesses particular utility as an ingredient of linoleum and mastic tile.

I claim as my invention:

The herein described method of oxidizing liquid aromatic still residue from the purification and distillation of coke-oven light oil containing unsaturates of the light oil aromatics in various stages of polymerization to produce a gummy mass having less elasticity than that resultant from oxidation of the total still residue content, which comprises oxidizing the still residue by blowing air therethrough for a treating period adequate to bring the still residue to a stage of oxidation at which it is solid at temperatures at least as elevated as normal room temperature; during the oxidation treatment supplying to the batch of still residue heat adequate to maintain it sufficiently liquid for the dispersion of air therein, and from the beginning of the treatment holding the temperature of the oily lower boiling polymers in such range above 250° F. and below a temperature at which straight distillation of such content takes place that from 20% to 70% of such content of oily lower boiling polymers is removed by blowing before oxidation has substantially proceeded in the batch, the rest of such content being so rendered non-volatile by oxidation attendant upon the blowing that it remains in the batch.

FRANK W. CORKERY.